(12) United States Patent
Xiao et al.

(10) Patent No.: US 10,578,341 B2
(45) Date of Patent: Mar. 3, 2020

(54) DUAL-CAVITY METHOD AND DEVICE FOR COLLECTING AND STORING SOLAR ENERGY WITH METAL OXIDE PARTICLES

(71) Applicant: Zhejiang University, Hangzhou, Zhejiang (CN)

(72) Inventors: Gang Xiao, Zhejiang (CN); Tianfeng Yang, Zhejiang (CN); Mingjiang Ni, Zhejiang (CN); Zhongyang Luo, Zhejiang (CN); Xiang Gao, Zhejiang (CN); Kefa Cen, Zhejiang (CN); Mengxiang Fang, Zhejiang (CN); Jinsong Zhou, Zhejiang (CN); Zhenglun Shi, Zhejiang (CN); Leming Cheng, Zhejiang (CN); Qinhui Wang, Zhejiang (CN); Shurong Wang, Zhejiang (CN); Chunjiang Yu, Zhejiang (CN); Tao Wang, Zhejiang (CN); Chenghang Zheng, Zhejiang (CN)

(73) Assignee: ZHEJIANG UNIVERSITY, Hangzhou, Zhejiang (CN)

( * ) Notice: Subject to any disclaimer, the term of this patent is extended or adjusted under 35 U.S.C. 154(b) by 591 days.

(21) Appl. No.: 14/898,694

(22) PCT Filed: Dec. 12, 2014

(86) PCT No.: PCT/CN2014/093675
§ 371 (c)(1),
(2) Date: May 31, 2016

(87) PCT Pub. No.: WO2016/090626
PCT Pub. Date: Jun. 16, 2016

(65) Prior Publication Data
US 2017/0191697 A1 Jul. 6, 2017

(51) Int. Cl.
*F24S 10/00* (2018.01)
*F28D 20/00* (2006.01)
(Continued)

(52) U.S. Cl.
CPC ............... *F24S 10/00* (2018.05); *F24S 20/20* (2018.05); *F24S 80/20* (2018.05); *F28D 20/003* (2013.01);
(Continued)

(58) Field of Classification Search
CPC ................................. F24S 10/00; F24S 20/20
See application file for complete search history.

(56) References Cited

U.S. PATENT DOCUMENTS

| 3,955,554 A | 5/1976 | Collie | |
|---|---|---|---|
| 4,777,934 A * | 10/1988 | De Laquil, III | ........ F03G 6/064 126/678 |
| 2014/0298822 A1* | 10/2014 | Ma | .......................... F03G 6/067 60/783 |

FOREIGN PATENT DOCUMENTS

| CN | 101719574 A | 6/2010 |
|---|---|---|
| CN | 102444993 A | 5/2012 |

(Continued)

OTHER PUBLICATIONS

Amsbeck English translation.*
(Continued)

*Primary Examiner* — Jason Lau
(74) *Attorney, Agent, or Firm* — David D. Brush; Westman, Champlin & Koehler, P.A.

(57) ABSTRACT

A dual-cavity method and device for collecting and storing solar energy with metal oxide particles. Solar radiation irradiates into a light receiving cavity of a dual-cavity, heat-collecting reactor to heat a separating plate and preheat metal oxide particles. The preheated metal oxide particles (Continued)

then enter a reacting cavity. As temperature increases, the metal oxide particles reduce to release oxygen, which discharges through a gas outlet. Reduced metal oxide particles discharge through a particle outlet into a particle storage tank, and then into an oxidation heat exchanger to react with the discharged oxygen discharged to release and transfer stored chemical energy to a medium to be heated. The oxidized metal oxide particles are conveyed into a storage tank, and again enter into a particle inlet of the light receiving cavity. Ambient air controls the gas flow rate in the reactor and the reacting rate in exchanger.

7 Claims, 1 Drawing Sheet

(51) Int. Cl.
*F24S 80/20* (2018.01)
*F24S 20/20* (2018.01)
*F24V 30/00* (2018.01)

(52) U.S. Cl.
CPC ............... *F24V 30/00* (2018.05); *Y02E 10/41* (2013.01); *Y02E 60/142* (2013.01); *Y02E 70/30* (2013.01)

(56) References Cited

FOREIGN PATENT DOCUMENTS

| CN | 103245087 A | 8/2013 | |
|---|---|---|---|
| CN | 104482663 A | 4/2015 | |
| CN | 204460759 U | 7/2015 | |
| DE | 102008036210 A1 * | 2/2010 | ............... F24J 2/07 |

OTHER PUBLICATIONS

International Search Report and Written Opinion dated Jul. 24, 2015 for corresponding International Patent Application No. PCT/CN2014/093675, filed Dec. 12, 2014.

English translation of the International Written Opinion dated May 8, 2015 for corresponding International Patent Application No. PCT/CN2014/093675, filed Dec. 12, 2014.

* cited by examiner

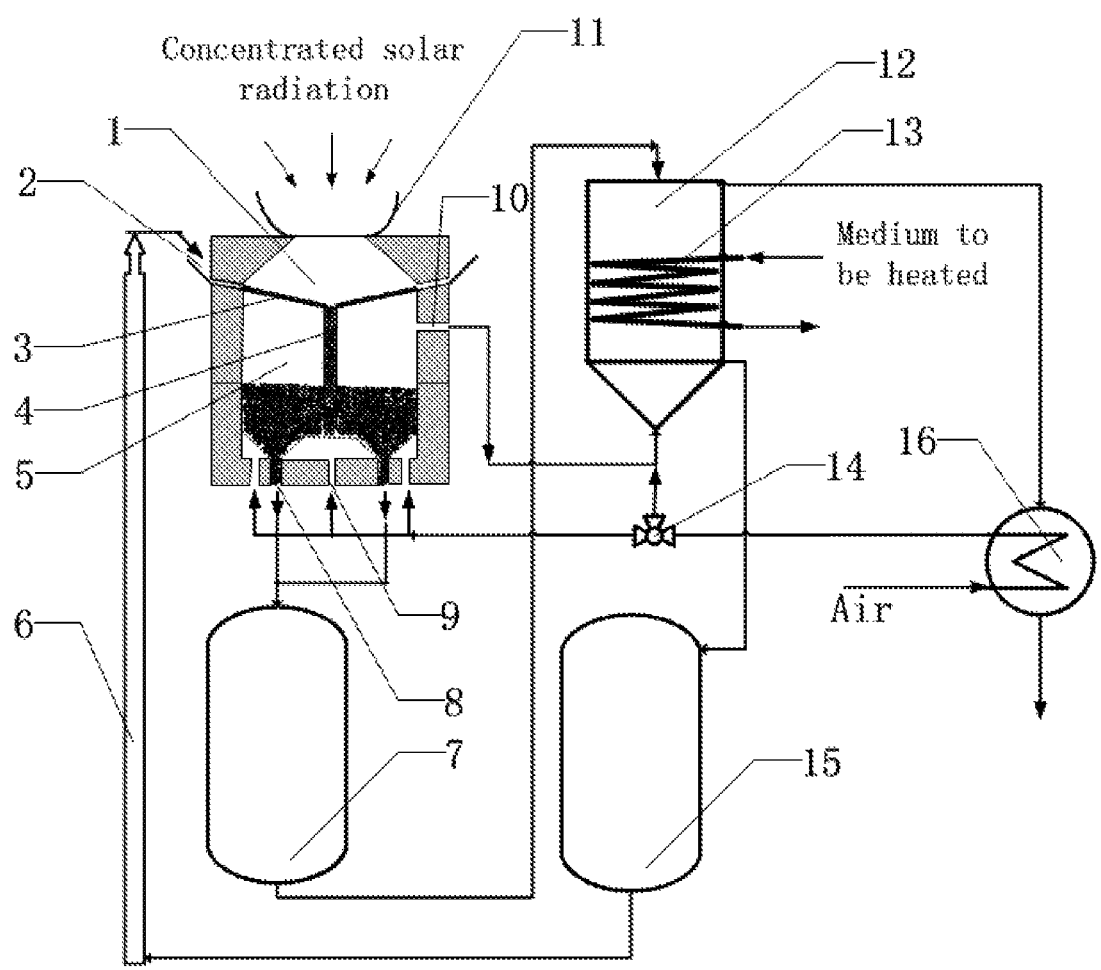

DUAL-CAVITY METHOD AND DEVICE FOR COLLECTING AND STORING SOLAR ENERGY WITH METAL OXIDE PARTICLES

CROSS-REFERENCE TO RELATED APPLICATIONS

This Application is a Section 371 National Stage Application of International Application No. PCT/CN2014/093675, filed Dec. 12, 2014, the content of which is incorporated herein by reference in its entirety.

FIELD OF THE INVENTION

The present invention relates to the technical field of solar thermochemical energy storage, especially a dual-cavity method and device for collecting and storing solar energy with metal oxide particles.

DESCRIPTION OF THE PRIOR ART

The overall amount of global solar radiation is about $1.7 \times 10^{17}$ W, of which China holds about 1% ($1.8 \times 10^{15}$ W, equivalent to 1,900,000 million tons of standard coal per annum), and which means 680 times the current annual energy consumption in the whole country of China and thus great development potential in China. However, because of low energy flux density, large energy fluctuation and expensive storage cost of solar energy, the adoption of a grid-connected photovoltaic power system (grid-connected PV system) will have a great impact on the grid safety. These problems have been affecting further development and utilization of solar energy. And solar thermochemical method exactly increases energy flux density by concentrating solar radiation with a solar concentrator, and reduces energy output fluctuations by thermal energy storage and thermochemical reactions, while storing the solar energy in the form of chemical energy.

Exactly because solar thermal power generation can store energy in a large scale at a low cost, there is a huge room for development using said manner in the future. Energy storage is classified into sensible heat storage, latent heat storage and chemical energy storage. Sensible heat storage stores thermal energy by increasing temperature without a phase change of material, and has a lower energy density. Common materials for sensible heat storage include sand, molten salt, etc. Latent heat storage stores energy by phase change. Generally, the heat amount required to be absorbed by phase change is large; thus, latent heat energy storage density is higher than sensible heat storage energy density, such as a phase-change material. Using chemical energy storage to store solar energy not only enables higher energy storage density but also enables storage over a long period of time at room temperature and facilitates transportation. It is general that solar energy is converted into chemical energy such as hydrogen, carbon monoxide, etc. Since gas storage devices have a more complex structure, said manner of chemical energy storage is more suitable for a large-scale system; in particular, a lot of following-up devices are required after further converting the hydrogen and carbon monoxide into liquid fuel for storage and transportation.

Solar thermochemical reaction is a strongly endothermic reaction with high temperature. In order to ensure that solar radiation is irradiated into the reactor, it is generally required that the reactor is provided with a window of quartz glass that can resist high temperature and function to seal the reactor. However, thermochemical reactants are more likely to contaminate the quartz glass. Hence, conventional chemical reactors not only have high costs of production but also contain certain risks of safety.

SUMMARY OF THE INVENTION

Targeting the problems such as the existing gas chemical energy storage having storage difficulty, and general chemical reactors adopting quartz glass causing high temperature and difficulty in sealing and easy contamination, the present invention provides a dual-cavity device and method for collecting and storing solar energy with metal oxide particles.

The present invention uses metal oxide particles to collect and store solar energy and adopts the manner of dual-cavity reactor for collection of heat energy, thus avoiding the use of quartz glass to seal the reacting cavity; and stores the solar energy in the form of chemical energy in reduced metal oxide particles, thus obtaining high storage density and facilitating storage and use with the particles.

The present invention is specifically described as follows:

The solar reactor is divided by a separating plate into two cavities of an upper one and a lower one, with the upper one being a light receiving cavity and the lower one being a reacting cavity. Concentrated solar radiation is irradiated into the light receiving cavity. Metal oxide particles enter the light receiving cavity through a particle inlet of the light receiving cavity, and flow through the separating plate. The solar energy is absorbed by both the metal oxide particles and separating plate at the same time, turning the solar energy to thermal energy. The metal oxide particles enter a central particle downcomer of the light receiving cavity, the particle downcomer outlet being in communication with the reacting cavity. As the temperature of the metal oxide particles gradually increases, the metal oxide particles are going to decompose and be reduced, releasing oxygen and absorbing heat energy. The required heat comes from the sensible heat energy with the metal oxide particles per se and from the thermal radiation energy emitted by the separating plate to the reacting cavity. The released oxygen gas is discharged through a gas outlet of the reacting cavity into a gas inlet of the oxidation heat exchanger. The reduced metal oxide particles are discharged from a particle outlet of the reacting cavity into an inlet of a reduced particle storage tank. Then, the reduced oxide particles discharged from an outlet of the reduced particle storage tank enter a particle inlet of the oxidation heat exchanger to react with the oxygen gas from the gas inlet of the oxidation heat exchanger within the oxidation heat exchanger, releasing heat which is transferred to a medium to be heated in heat exchange pipes of the oxidation heat exchanger. The metal oxides discharged from the particle outlet of the oxidation heat exchanger enter the particle inlet of the oxidized particle storage tank. The metal oxide particles discharged from the particle outlet of the oxidized particle storage tank are conveyed by a particle conveyor into the light receiving cavity particle inlet, completing a particle cycle. In order to increase the temperatures of the light receiving cavity and reacting cavity, a secondary concentrator is added to the light receiving cavity to increase the solar concentration ratio.

The solar energy is stored in the form of chemical energy in a stable way by reducing endothermic reaction of the particle oxides. And according to the need of users, the reduced particles release heat within the oxidation heat exchanger in a stable way, providing the required energy to the outside. In order to control a rate of gas products flowing from the reacting cavity into the oxidation heat exchanger, the present invention introduces ambient air into the reacting cavity through the gas inlet of the reacting cavity, mixing the ambient air with the oxygen released from the decomposition of the metal oxide particles, thus forming oxygen-rich air. The mixed gases re-enter the gas inlet of the oxidation heat exchanger to react with the reduced metal oxides. Unreacted, residual gas is discharged through the gas outlet of the oxidation heat exchanger. Likewise, in order to better control the internal heat release rate of the oxidation heat exchanger, especially in the event of insufficient released oxygen inside the reacting cavity when there is no solar energy, the present invention introduces ambient air through the gas inlet of the oxidation heat exchanger. Oxygen in the air reacts with the reduced metal oxides to release heat; unreacted air is discharged through the gas outlet of the oxidation heat exchanger. In order to reduce heat loss caused by the residual gas discharged from the gas outlet of the oxidation heat exchanger, a recuperator is added to transfer the heat from the residual gas discharged from the gas outlet of the oxidation heat exchanger to the ambient air that is about to enter the gas inlet of the reacting cavity and the gas inlet of the oxidation heat exchanger, thus increasing the temperature of air entering the reacting cavity and the oxidation heat exchanger. As a result, the temperature of ultimate exhaust gas from the oxidation heat exchanger is reduced, hence improving the overall system efficiency.

The said metal oxide particles comprise one or more from the group consisting of iron oxide, manganese oxide, cobalt oxide, copper oxide, barium oxide and antimony oxide. The medium to be heated in pipes of the oxidation heat exchanger comprises one or more from the group consisting of air, water, hydrogen, helium, nitrogen and carbon dioxide.

BRIEF DESCRIPTION OF THE DRAWING

FIG. 1 is a schematic view of a dual-cavity device for collecting and storing solar energy with metal oxide particles.

DETAILED DESCRIPTION OF THE PREFERRED EMBODIMENT

The following reference numerals are used in FIG. 1:
a light receiving cavity 1,
a light receiving cavity particle inlet 2,
a separating plate 3,
a particle downcomer 4,
a reacting cavity 5,
a particle conveyor 6,
a reduced particle storage tank 7,
a reacting cavity particle outlet 8,
a reacting cavity gas inlet 9,
a reacting cavity gas outlet 10,
a secondary solar concentrator 11,
an oxidation heat exchanger 12,
oxidation heat exchanger pipes 13,
a three-way control valve 14,
an oxidized particle storage tank 15, and
a recuperator 16.

As shown in FIG. 1, a dual-cavity device for collecting and storing solar energy with metal oxide particles characterized by comprising a secondary concentrator 11, a light receiving cavity 1, a reacting cavity 5, a reduced particle tank 7, an oxidized particle storage tank 15, an oxidation heat exchanger 12, wherein the secondary concentrator 11 is disposed at a solar incident light aperture of the light receiving cavity 1; the light receiving cavity 1 and the reacting cavity 5 are separated by a separating plate 3 and are connected by a downcomer 4; a reacting cavity gas outlet 10 is connected to a gas inlet of the oxidation heat exchanger 12; a reacting cavity particle outlet 8 is connected to a particle inlet of the reduced particle storage tank 7; a particle outlet of the reduced particle storage tank 7 is connected to a particle inlet of the oxidation heat exchanger 12; a particle outlet of the oxidation heat exchanger 12 is connected to a particle inlet of the oxidized particle storage tank 15; and a particle outlet of the oxidized particle storage tank 15 is connected to a light receiving cavity particle inlet 2 by a particle conveyor 6.

The reactor device is divided by the separating plate 3 into two cavities of an upper one and a lower one, with the upper one being a light receiving cavity 1 and the lower one being a reacting cavity 5. Concentrated solar radiation is irradiated into the light receiving cavity 1. Metal oxide particles enter the light receiving cavity 1 through a particle inlet 2 of the light receiving cavity, and flow through the separating plate 3. The solar energy is absorbed by both the metal oxide particles and separating plate 3 at the same time, turning the solar energy to thermal energy. The metal oxide particles enter a central particle downcomer 4 of the light receiving cavity, the particle downcomer 4 outlet being in communication with the reacting cavity 5. As the temperature of the metal oxide particles gradually increases, the metal oxide particles are going to decompose and be reduced, releasing oxygen. The released oxygen gas is discharged through a gas outlet 10 of the reacting cavity into a gas inlet of the oxidation heat exchanger 12. The reduced metal oxide particles are discharged from a particle outlet 8 of the reacting cavity into a particle inlet of a reduced particle storage tank 7. Then, the reduced oxide particles discharged from a particle outlet of the reduced particle storage tank enter a particle inlet of the oxidation heat exchanger 12 to react with the oxygen gas from the gas inlet of the oxidation heat exchanger 12 within the oxidation heat exchanger 12, releasing heat which is transferred to a medium to be heated in heat exchange pipes 13 of the oxidation heat exchanger. The metal oxide particles discharged from the particle outlet of the oxidation heat exchanger 12 enter the particle inlet of the oxidized particle storage tank 15. The metal oxide particles discharged from the particle outlet of the oxidized particle storage tank 15 are conveyed by a particle conveyor 6 to re-enter the light receiving cavity particle inlet 2, completing a solid particle cycle. In order to increase the temperatures of the light receiving cavity 1 and reacting cavity 5, a secondary concentrator 11 is added to the light receiving cavity to increase the solar concentration ratio.

The reduced particle storage tank 7 and the oxidized particle storage tank 15 enable the oxidizing exothermic reaction inside the oxidation heat exchanger 12 to be operated in a sustainable and stable way; and can store the solar energy collected in daytime for later use in nighttime, thus satisfying user requirements. In order to control a rate of gas products flowing from the reacting cavity 5 into the oxidation heat exchanger 12, ambient air is introduced into the reacting cavity 5 through the gas inlet 9 of the reacting cavity, and mixed with the oxygen released from the decomposition of the metal oxide particles to form oxygen-rich air. The mixed gases re-enter the gas inlet of the oxidation heat exchanger 12 to react with the reduced metal oxides. Unreacted, residual gas is discharged through the gas outlet of the oxidation heat exchanger 12. Likewise, in order to better control the internal heat release rate of the oxidation heat exchanger 12, especially when there is no solar energy, ambient air is introduced through the gas inlet of the oxidation heat exchanger 12. Oxygen in the air reacts with the reduced metal oxides to release heat; unreacted air is discharged through the gas outlet of the oxidation heat exchanger 12. In order to reduce heat loss caused by the residual gas discharged from the gas outlet of the oxidation heat exchanger 12, a recuperator 16 is added to transfer the heat from the gas discharged from the gas outlet of the oxidation heat exchanger 12 to the air that is about to enter the gas inlet 9 of the reacting cavity and the gas inlet of the oxidation heat exchanger 12. As shown in FIG. 1, a flow of the air entering the reacting cavity gas inlet 9 and the oxidation heat exchanger 12 gas inlet is controlled by a three-way control valve 14 to improve system efficiency.

The said metal oxide particles comprise one or more from the group consisting of iron oxide, manganese oxide, cobalt oxide, copper oxide, barium oxide and antimony oxide.

The medium to be heated in pipes of the oxidation heat exchanger comprises one or more from the group consisting of air, water, hydrogen, helium, nitrogen and carbon dioxide.

The said reacting cavity 5 is further provided with an air inlet through which ambient air can be fed into the reacting cavity 5.

The said ambient air fed into the reacting cavity 5 has heat exchange in the recuperator 16 with the residual gas discharged from the oxidation heat exchanger 12 gas outlet in advance to increase the air temperature and reduce the residual gas temperature.

The said oxidation heat exchanger 12 gas inlet is further provided with an air inlet, through which ambient air can be fed into the oxidation heat exchanger 12.

The said ambient air fed into oxidation heat exchanger 12 has heat exchange in the recuperator 16 with the residual gas discharged from the oxidation heat exchanger 12 gas outlet in advance to increase the air temperature and reduce the residual gas temperature.

A secondary concentrator 11 is added at the solar incident light aperture of the said light receiving cavity 1.

In comparison with the prior art, the present invention has the following technical benefits:

1. The present invention makes use of a dual-cavity structure, which has a light receiving cavity and a reacting cavity separated by a separating plate. The dual-cavity structure not only avoids glass seal difficulty at high temperature and glass pollution issues, but also improves system safety and reliability. In addition, the high-temperature separating plate could be used to transfer the absorbed heat energy in the form of radiation to the reactants inside the reacting cavity.

2. The metal oxide particles flow inside the light receiving cavity and absorb heat, and are preheated to a certain temperature and then are conveyed into the reacting cavity. The metal oxide particles gradually decompose to release oxygen and absorb heat. The required heat comes from the sensible heat of the metal oxide particles per se and the radiation energy of the separating plate against the reacting cavity. The manner of transfer of these two kinds of energies improves the heat transfer rate, and enables chemical reaction to be sufficiently performed.

3. The sealing function inside the reacting cavity enables the oxygen released from decomposition of the metal oxide particles to be directly used as a reactant gas in the oxidation heat exchanger, thus preventing waste of gas, reducing exhaust gas loss and improving system efficiency.

4. The energy density of chemical energy storage of the metal oxide particles is higher than the energy density of sensible heat storage of the metal oxide particles, so that the volume of the storage tank is reduced. Besides, the chemical energy storage of metal oxide particles can be stored easier than the chemical energy storage of gaseous products. As a result, using metal oxide particles is an effective way to reduce system cost and improve economic returns.

Although the present disclosure has been described with reference to one or more examples, workers skilled in the art will recognize that changes may be made in form and detail without departing from the scope of the disclosure and/or the appended claims.

The invention claimed is:

1. A dual-cavity method for collecting and storing solar energy with metal oxide particles, wherein the method comprises:

providing a solar reactor, which is divided into an upper cavity and a lower cavity by a separating plate, the upper cavity being a light receiving cavity and the lower cavity being a reacting cavity, wherein the separating plate at least partially forms a wall of the reacting cavity;

passing metal oxide particles into the light receiving cavity through a light receiving cavity particle inlet, which flow through the separating plate;

irradiating the light receiving cavity with concentrated solar radiation, which heats the metal oxide particles and the separating plate;

passing the heated metal oxide particles into the reacting cavity from the light receiving cavity, producing a reaction as the heating continues to operate, in which the heated metal oxide particles gradually decompose and are reduced to release oxygen and absorb heat, and emitting thermal radiation from heat absorbed by the separating plate in the light receiving cavity into the reacting cavity, wherein heat for the reaction is provided together by heat from the heated solid particles per se and the separating plate's thermal radiation into the reacting cavity; and discharging the oxygen released in the reaction process through a reacting cavity gas outlet, and discharging the reduced metal oxide particles from a reacting cavity particle outlet, wherein solar energy is stored in the reduced metal oxide particles in the form of chemical energy, wherein the reduced metal oxide particles discharged from the reacting cavity particle outlet enter a reduced particle storage tank; and when heat energy is needed, the reduced metal oxide particles enter a particle inlet of an oxidation heat exchanger, and the gas discharged from the reacting cavity gas outlet enters a gas inlet of the oxidation heat exchanger to react with the reduced metal oxide particles to release heat; the released heat is transferred to a medium to be heated in heat exchange pipes of the oxidation heat exchanger; the residual gas is discharged from the oxidation heat exchanger gas outlet, while the oxidized metal oxide particles enter an oxidized particle storage tank and later, via a particle conveyor, come back to the light receiving cavity particle inlet, completing a metal oxide particle cycle;

providing ambient air to a recuperator, which performs heat exchange in the recuperator with residual gas discharged from the oxidation heat exchanger gas outlet to increase the temperature of the ambient air and reduce the residual gas temperature; and feeding the ambient air with increased temperature into an air inlet to the reacting cavity.

2. The dual-cavity method for collecting and storing solar energy with metal oxide particles according to claim 1, wherein the metal oxide particles comprise one or more from the group consisting of iron oxide, manganese oxide, cobalt oxide, copper oxide, barium oxide and antimony oxide.

3. The dual-cavity method for collecting and storing solar energy with metal oxide particles according to claim 1, wherein the medium to be heated in the oxidation heat exchanger pipes comprises one or more from the group consisting of air, water, hydrogen, helium, nitrogen and carbon dioxide.

4. The dual-cavity method for collecting and storing solar energy with metal oxide particles according to claim 1, further comprising providing the oxidation heat exchanger gas inlet with an air inlet, through which ambient air can be fed into the oxidation heat exchanger.

5. The dual-cavity method for collecting and storing solar energy with metal oxide particles according to claim 4, wherein the ambient air fed into oxidation heat exchanger has heat exchange in the recuperator with residual gas discharged from the oxidation heat exchanger gas outlet in advance to increase the air temperature and reduce the residual gas temperature.

6. The dual-cavity method for collecting and storing solar energy with metal oxide particles according to claim 1, further comprising providing a secondary concentrator to a solar incident light aperture of the light receiving cavity.

7. A dual-cavity device for collecting and storing solar energy with metal oxide particles, comprising:
 a solar reactor, which is divided into an upper cavity and a lower cavity by a separating plate, the upper cavity being a light receiving cavity and the lower cavity being a reacting cavity, wherein the separating plate at least partially forms a wall of the reacting cavity, and wherein:
  the light receiving cavity comprises:
   an incident light aperture; and
   a light receiving cavity particle inlet;
  the reacting cavity is connected to the light receiving cavity by a particle downcomer, and the reacting cavity comprises:
   a reacting cavity gas outlet;
   a reacting cavity particle outlet; and
   an air inlet to the reacting cavity, through which ambient air can be fed into the reacting cavity; and
  the separating plate is arranged to emit thermal radiation from heat absorbed by the separating plate in the light receiving cavity into the reacting cavity;
 a secondary concentrator disposed upon the incident light aperture of the light receiving cavity;
 a reduced particle storage tank comprising:
  a reduced particle storage tank particle inlet connected to the reacting cavity particle outlet, wherein reduced metal oxide particles discharged from the reacting cavity particle outlet enter the reduced particle storage tank; and
  a reduced particle storage tank particle outlet;
 an oxidized particle storage tank comprising:
  an oxidized particle storage tank particle inlet;
  an oxidized particle storage tank particle outlet connected via a particle conveyor to the light receiving cavity particle inlet, completing a metal oxide particle cycle;
 an oxidation heat exchanger comprising:
  an oxidation heat exchanger gas inlet connected to the reacting cavity gas outlet, wherein gas discharged from the reacting cavity gas outlet enters the oxidation heat exchanger gas inlet;
  an oxidation heat exchanger particle inlet connected to the reduced particle storage tank particle outlet, wherein the reduced metal oxide particles enter the particle inlet of the oxidation heat exchanger to react with the gas to release heat;
  an oxidation heat exchanger particle outlet connected to the oxidized particle storage tank particle inlet configured such that oxidized metal oxide particles enter the oxidized particle storage tank;
  heat exchange pipes configured to transfer the released heat to a medium to be heated;
  an oxidation heat exchanger gas outlet configured to discharge residual gas from the oxidation heat exchanger; and
 a recuperator having a gas inlet connected to the oxidation heat exchanger gas outlet to receive the residual gas discharged from the oxidation heat exchanger gas outlet, and having an ambient air inlet to receive ambient air, and being configured to heat exchange the ambient air with the residual gas to increase the temperature of the ambient air and reduce the temperature of the residual gas, and having an outlet connected to pass the ambient air with increased temperature to the air inlet to the reacting cavity.

* * * * *